7/9/85 OR 4,527,863

United States Patent [19]

Glasper et al.

[11] Patent Number: 4,527,863

[45] Date of Patent: Jul. 9, 1985

[54] ELECTRONIC DISPLAYS

[75] Inventors: John L. Glasper, Ledbury; Ian A. Shanks, Pavenham; Michael G. Clark, Malvern, all of England

[73] Assignee: The Secretary of State for Defence in Her Britannic Majesty's Government of the United Kingdom of Great Britain and Northern Ireland, London, England

[21] Appl. No.: 541,309

[22] Filed: Oct. 12, 1983

[30] Foreign Application Priority Data

Oct. 14, 1982 [GB] United Kingdom ................ 8229450

[51] Int. Cl.[3] ......................... G02F 1/133; G09F 9/00

[52] U.S. Cl. ..................................... 350/336; 340/784

[58] Field of Search ........................ 350/336; 354/271; 368/30, 84, 242; 340/784, 765

[56] References Cited

U.S. PATENT DOCUMENTS

| | | | |
|---|---|---|---|
| 3,588,225 | 6/1971 | Nicastro | 350/336 X |
| 3,800,524 | 4/1974 | Matsumura et al. | 368/84 |
| 3,955,208 | 5/1976 | Wick | 350/336 |
| 4,313,663 | 2/1982 | Stemme | 350/336 X |
| 4,326,279 | 4/1982 | Shanks | 368/242 X |
| 4,422,729 | 12/1983 | Suzuki | 350/336 |

*Primary Examiner*—John K. Corbin
*Assistant Examiner*—David Lewis
*Attorney, Agent, or Firm*—Cushman, Darby & Cushman

[57] ABSTRACT

A polar co-ordinate display of full 360° arc comprised of electrode bearing substrates each side of a layer of dyed phase change liquid crystal material. One set of electrodes comprises concentric spirals, the other set comprises radials. The display is multiplex addressed using four select waveform signals. These four signals $V_1$, $V_2$, $V_3$, and $V_x$ satisfy the following conditions:

$$RMS(V_x - V_i) = V_p,\ i = 1, 2 \text{ or } 3;$$

$$RMS(V_1 - V_2) = V_p;\ RMS(V_1 - V_3) = V_0$$

where $V_p$ is an upper threshold voltage, and $V_0$ a saturation voltage for dyed phase change hysteresis, and may be of the coded form;

$V_1$=,1010,;
$V_2$=,1100,;
$V_3$=,0101,;
$V_x$=,0110,.

These may be generated using two 2-bit registers with exclusive OR-gate feedback.

3 Claims, 8 Drawing Figures

ELECTRONIC DISPLAYS

TECHNICAL FIELD

This invention concerns electronic displays, and in particular matrix addressable electro-optic or light emissive displays suitable for polar coordinate or other radial representation.

A typical electronic display comprises electrode bearing substrates located one each side of an electrically sensitive medium, the electrodes on one side of the medium being registered opposite the electrodes on the other side and defining by their overlap a display area formed of a matrix of addressable intersections. On application of appropriate electrical address signals to the electrodes, certain of the intersections, those selected, appear in optical contrast to all others, and thus serve to represent and display data.

The invention has application, for example, to the display of radar data. It has application to the display of other data that may be represented in polar coordinate form, and may be used for time display in clock or watch applications.

BACKGROUND ART

A radial waveform display is described in United Kingdom Pat. No. 1,559,074. That display, one intended for analogue representation of a data signal waveform, is limited to display over a sector of arc and is comprised of two sets of electrodes, one set of electrodes being in the form of arcuate concentric annular segments, and the intersecting set of electrodes being in the form of radial segments.

For many applications, however, full 360° coverage is required. If a concentric circular electrode pattern were to be used, it would be difficult if not impossible to provide contact to the concentric electrodes, without, at the same time, employing complex multi-layer techniques or without breaking the continuity of the full annular concentric electrodes to make contact in the same plane. Where contact is to be made in the same plane, dead-space incapable of display representation must be introduced to incorporate lead-out contacts.

DISCLOSURE OF THE INVENTION

The invention is intended to provide a radial display capable of providing full 360° coverage.

In accordance with the invention there is provided an electronic display comprising electrode bearing substrates located one each side of an electrically sensitive medium; a display characterised in that at least the electrodes on one side of the medium are configured as concentric spirals, each one extending from near centre of display area to its periphery, the collection of these electrodes covering an area a full 360° of arc.

In this manner therefore each and every one of the electrodes on the one side of the medium is accessible at the periphery of the display, and contact may be made without any disruption in the continuity of the display area. Furthermore, contact fan-out may be incorporated in the same plane as the electrodes, and can be provided by single stages of metal or conductive oxide coating and photolithographic definition.

The intersecting electrodes on the other side of the medium may be radial segments. Alternatively, they may also be concentric spirals, but spirals extending in opposite sense, i.e. either clockwise or anticlockwise as appropriate. In this case the two sets of spirals could be chosen orthogonal. The electrodes may of course be conformed to define a display area that is circular, elliptical or of other convenient form.

It is advantageous to provide as address control for this display one which serves to drive selected matrix intersections OFF to display data against a contrasting background defined by all remaining matrix intersections which are driven ON. See for example the types of address control described in United Kingdom Pat. No. 1,559,074. Indeed it is advantageous to use as address signals, signals that are isogonal to each other. In use identical signals (i.e. signals of identical waveform and phase) are applied to each pair of electrodes defining a selected intersection, and non-identical isogonal signals across all other remaining intersections. It is convenient to use as isogonal signals, signals of pseudo-random binary coded waveform (see GB. No. 2,001,794A).

In further accord with the invention there is provided a polar coordinate plotter comprising in cooperative combination:

a display including a set of concentric spiral electrodes and a set of radial electrodes disposed each side of an electrically sensitive medium, these electrodes defining by their overlap a display area formed of a matrix of intersections;

an address signals source, for providing a set of isogonal address signals, connected to one set of electrodes to address each with a different one of the isogonal signals; and, an address control, responsive to coordinate data, connected to the other set of electrodes, to apply to selected electrodes address signals identical to signals applied to the one set of electrodes to drive the display OFF at selected intersections representative of the data, and to apply signals isogonal with every signal applied to the one set of electrodes, to all remaining electrodes, together such as to drive the display ON at all other matrix intersections.

The plotter defined above may be used as a plotter for radar target data display, and may be combined with a radar data source.

In yet further accord with the invention there is provided an alternative polar co-ordinate plotter comprising the co-operative combination of:

a display including a set of concentric spiral electrodes and a set of radial electrodes arranged opposite one another and disposed either side of an electrically sensitive medium of dyed phase change liquid crystal material, the electrodes defining by their overlap a display area formed by a matrix of intersections;

an address signals source for providing a set of four signal waveforms $V_1$, $V_2$, $V_3$ and $V_X$;

a first multiplex address control, responsive to co-ordinate data, connected to the radial electrodes, for applying one of the two signals $V_1$ or $V_X$ to each radial electrode in turn, whilst at the same time applying the signal $V_X$ to all other radial electrodes; and, a second multiplex address control, responsive to co-ordinate data, connected to the spiral electrodes, for applying to these all each turn selected voltages $V_1$, $V_2$ and $V_3$;

the set of four signal waveforms $V_1$, $V_2$, $V_3$ and $V_X$ having the following conditioned interrelationships:

$$RMS(V_X - V_1) = RMS(V_X - V_2) = RMS(V_X - V_3) = V_p;$$

$$RMS(V_1 - V_2) = V_p;\ RMS(V_1 - V_3) = V_o;$$

where $V_p$ is an upper threshold voltage, and $V_o$ a saturation voltage, for dyed phase change hysteresis.

This alternative plotter has advantage in that it allows multiple target display each radial, and may be operated at relatively low clock rate resulting in a low power consumption. It may be implemented to give either positive or negative contrast.

BRIEF INTRODUCTION OF THE DRAWINGS

Of the drawings that accompany this specification:

DESCRIPTION OF THE PREFERRED EMBODIMENT

Embodiments of the invention will now be described, by way of example only, with reference to the accompanying drawings.

Figure 1:
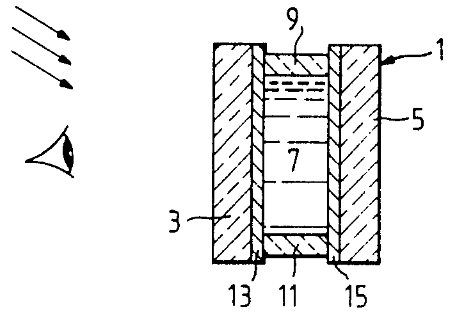
FIG. 1 shows in cross-section a liquid crystal medium display panel.

A liquid crystal medium display panel 1 is shown in FIG. 1. It is comprised of two electrode bearing glass substrates 3 and 5 placed each side of an electrically sensitive medium 7, a thin layer of liquid crystal material. These substrates 3 and 5 are held apart by means of glass fibre spacers 9 and 11 and a thermoplastic seal is applied to enclose the liquid medium 7.

Figure 2:
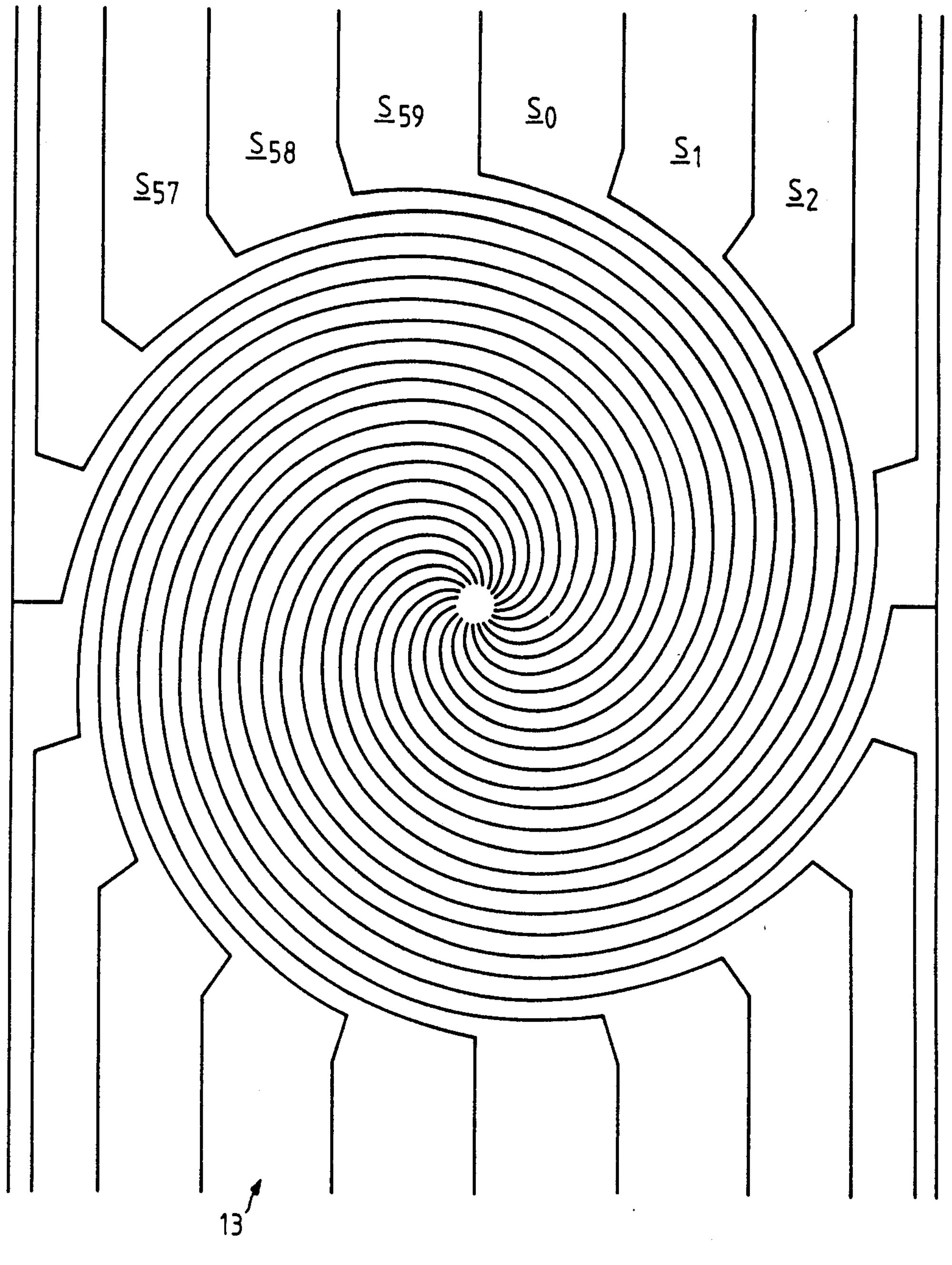
FIGS. 2 and 3 show in plan view the configuration of the electrodes of the display panel shown in FIG. 1 above, spiral electrodes and radial electrodes, respectively.

One of the two substrates 3 and 5, substrate 3, here shown as the front substrate, bears a set of electrodes 13 which are configured in the form of a number of concentric spirals, sixty in total. This configuration is shown in FIG. 2, but for the purpose of clear illustration in this drawing the number of spirals shown has been reduced to twenty. Each of the spiral electrodes 13 (individual electrodes $S_0 \ldots S_{59}$) extends from near the centre of the display area to its periphery. Each starts at a different angular position near the display centre and winds anti-clockwise towards the periphery. At the periphery of the display area the electrodes 13 ($S_0 \ldots S_{59}$) are fanned-out and extend to the extremities of the supporting substrate 3 to facilitate connection to an external drive supply.

Figure 3:
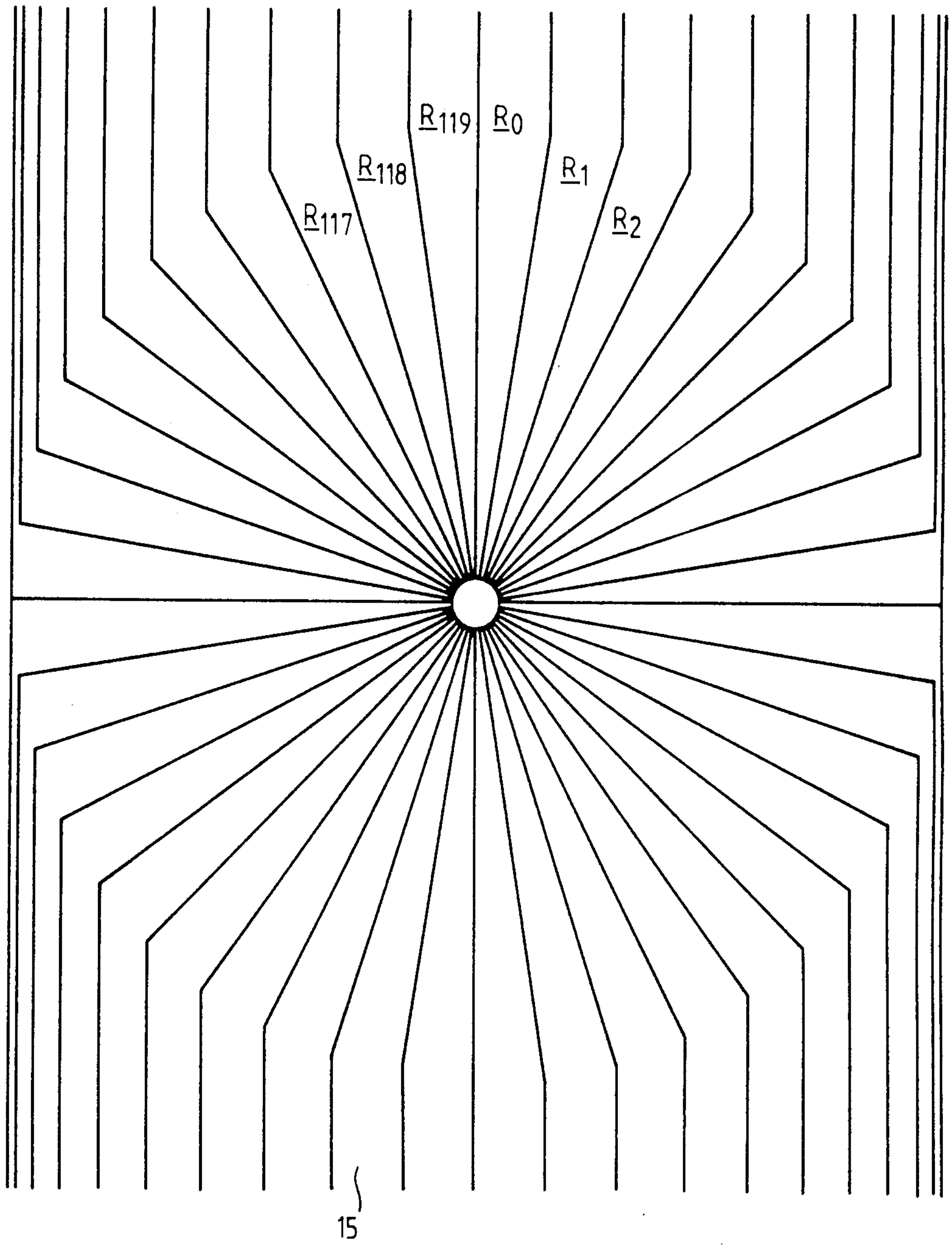

The other substrate, the rear substrate 5, bears a set of electrodes 15 (individual electrodes $R_0 \ldots R_{119}$) which are configured in the form of a number of radial segments, one-hundred-and-twenty in total. This configuration is shown in FIG. 3, but again for clear illustration the number shown has been reduced by a factor of three.

As assembled, with the two sets of electrodes 13 and 15 arranged opposite each other and registered centre-to-centre, a circular display area is defined by the overlap of these electrodes, an area formed of $60 \times 120$, i.e 7,200 individual matrix intersections. Part of the plan view of the pannel 1 is shown enlarged in FIG. 4, and this illustrates the matrix of intersections $I(I_{i,j})$ defined by the overlap of the spiral electrodes 13 ($S_i$) and the radial electrodes 15 ($R_j$).

This radial display thus allows the plotting of coordinate defined data to an angle ($\theta$) resolution of 3° and to an average radius (r) resolution of 1/60th of maximum of display range ($r_{max}$). It is noted that range resolution will vary marginally, decreasing with increasing range, due to the divergence of the spiral electrodes 13.

The spiral electrodes 13, as shown in FIG. 2, are delineated by linear spirals; their average radius $\hat{r}_i$ is given by a linear relation:

$$\hat{r}_i = k(\theta - \theta_i).$$

The use of other forms of spiral, however, is not precluded.

the display 1 in detail includes as medium 7 a dye phase change material:

a nematic material E61 (supplied by BDH Ltd, England); a dye D85 (supplied by BDH Ltd, England); mixed with 3.5 wt % of a cholesteric material CB15 (supplied by BDH Ltd, England).

This mixture is cholestrogenic, with a relatively long chiral pitch, and the dye molecules are aligned with the liquid crystal molecules by guest-host interaction. The front electrodes 13 have been etched in indium tin oxide coated glass using standard photolithography and etching techniques and they have been coated with a silicon monoxide barrier layer provided by evaporation. These electrodes 13 are reasonably transparent to visible light. The display includes an internal reflector. This is provided by the rear electrodes 15. To this end the rear substrate 5 has been roughened by lapping with 600 grade carborundum and etched with hydrofluoric acid, and aluminium deposited. This provides a matt white reflecting surface. The radial electrode pattern (FIG. 3) has then been defined by standard photolith-etch definition and a barrier layer of silicon monoxide supplied. Both electrode bearing substrates 3 and 5 have then been treated with a surfactant, lecithin. This treatment ensures proper alignment of the liquid crystal and dye molecules both initially and at those intersections where the display is driven OFF when later, during operation, address signals are applied to the electrodes. The panel cell components 3, 5, 9 and 11 have been assembled and the space between the substrates 3 and 5 evacuated prior to admission of the dyed liquid crystal mixture.

Figure 4:
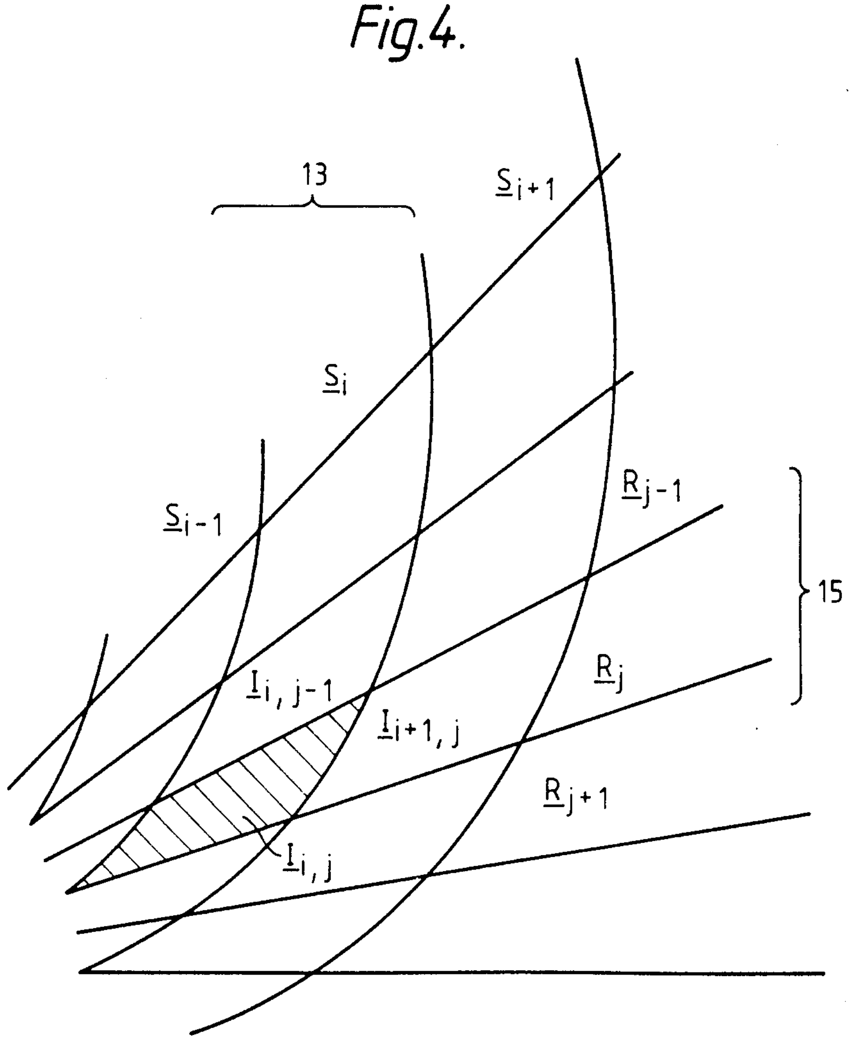
FIG. 4 is an enlarged plan view of part of the panel shown in FIG. 1 above, showing matrix intersections defined by the overlap of the spiral electrodes of FIG. 2 with the radial electrodes of FIG. 3.

As shown in FIG. 4, each of the spiral electrodes 13 starts on an alternate radial spiral, near the display area centre. Thus, for example, spiral $S_i$ starts on radial $R_j$ and also overlaps the next adjacent radial $R_{j+1}$. The intersection $I_{i,j}$ formed by this overlap forms the innermost gate for that particular bearing, the bearing to which the radial $R_j$ corresponds. For that bearing, consecutive range gates are accessed by moving over successive spirals. For any particular value of the coordinates, range (r) and bearing ($\theta$), there corresponds a unique matrix intersection $I_{i,j}$. This is defined by the overlap of the radial $R_j$ for that bearing, with a particular one of the spirals $S_0 \ldots S_{59}$, spiral $S_i$. The selection of this particular spiral $S_i$ is dependent on both range and bearing values. In general the index number i of the selected spiral is given by the following algorithm:

$$i = \tfrac{1}{2}j + n;\ (\tfrac{1}{2}j + n) < 60;$$

$$= \tfrac{1}{2}j + n - 60;\ (\tfrac{1}{2}j + n) \geqq 60;$$

where j is the radial index number for the given bearing $\theta$(j = Integer [$\theta$]), and n is the number of the range gate counted from centre for the range r given. This algorithm is used to convert polar-coordinate defined data coded as range number n and bearing number j into a form useable by the display—i.e. to spiral number i and radial number j.

Figure 5:
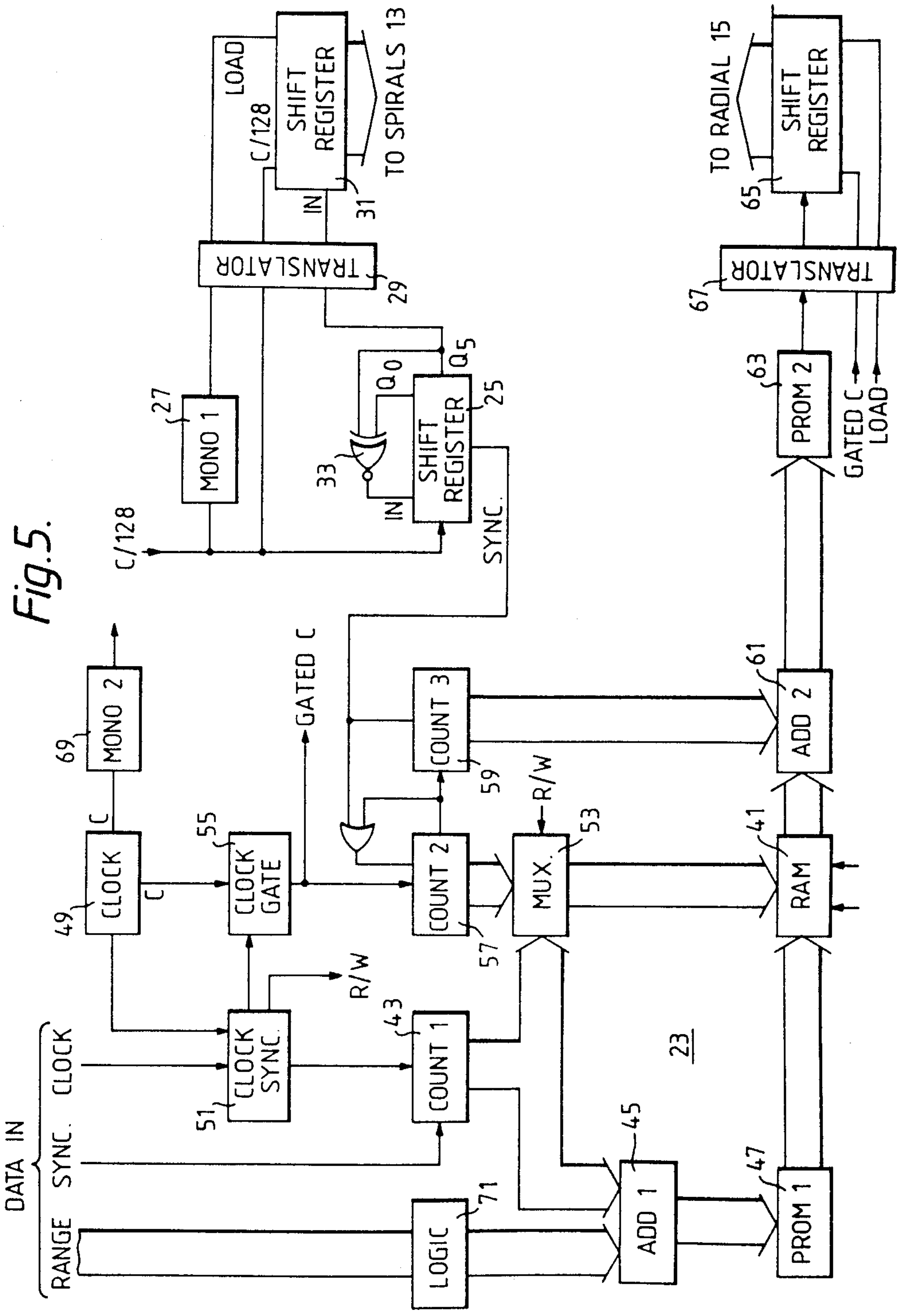
FIG. 5 is a circuit block diagram showing both an address signals source circuit and an address control circuit designed each to drive the panel shown in FIG. 1 above.

The electronics for driving this display 1 is shown in FIG. 5. It comprises two synchronised circuits: one, a pseudo-random binary coded waveform signals source 21; the other, an address control 23.

The signals source 21 provides sixty reference waveform signals, a different signal for each one of the sixty spiral electrodes 13 ($S_0 \ldots S_{59}$). It includes an input shift register 25, a monopulse delay 27 (MONO 1), a logic level translator 29 and a latched output shift register 31.

The first and sixth stage outputs $Q_0$, $Q_5$ of the input shift register 25 are referred to its input IN via an exclusive NOR-gate 33. This feedback introduces pseudo-random coding in the register signal output. The input register 25 is clocked by a signal derived from a master clock in the control circuit 23. This master clock runs at a rate of 250 kHz and has been divided down ($\div$128) to give a clocking rate of approx. 2 kHz. As the input shift register 25 is clocked, stored logical bits in the register 25 are shifted one bit at a time and a string of bit pulses 1 or 0 are output from the sixth stage output $Q_5$. The bit sequence corresponding to the $(Q_0 + Q_5)$ feedback repeats once every $2^6 - 1$ i.e every 63 bits. This pseudo-random coded sequence is loaded into the output register 31 one bit at a time. The output register 31 operates at 15 V level and generates the drive reference waveform signals for the sixty spiral electrodes 13 ($S_0 \ldots S_{59}$). This register 31 is clocked synchronously with the input register 25. It is loaded bit by bit on each 2 kHz clock cycle and after a delay that allows for one stage bit transfer along the register 31 it is strobed and the latched stages of the register 31 are reloaded. This delay is provided by MONO 27. For low power operation the input shift register 25, MONO 27, and NOR-gate 33, have been chosen to operate at 5 V level. The load, clock, and signal pulses supplied to the output shift register 31 are thus changed to 15 V level; they are supplied via the translator 29. The output shift register 31 comprises two serial in-parallel out 32-bit shift registers connected in series. The first sixty output stages ($Q_0 \ldots Q_{59}$) of this register are connected one to each spiral electrode 13 ($S_0 \ldots S_{59}$). The signals fed to these electrodes are identical in waveform but differ in phase. Signals from consecutive outputs ($Q_n$, $Q_{n+1}$) differ in phase by a shift of one bit pulse length. The sixty signals form a set of isogonal signals—the RMS average difference between any two signals is of constant value and is of sufficient amplitude to drive the display 1.

The address control 23 processes data from a radar receiver and from the values of target range for each consecutive bearing it determines the index number of the appropriate spiral for that range and bearing. This information is stored in a random access memory 41 (RAM) and is used to select the individual signal bits for each radial electrode 15. In RAM 41 the memory location corresponds to the bearing, whilst the memory contents represents spiral number.

The data processing section of the address control 23, includes an external clock pulse counter 43 (COUNT 1), an adder 45 (ADD 1) and a programmed read only memory 47 (PROM 1). Data presented to the address control 23 is in the form of: a 6-bit range address—this is a 6-bit binary number indicating target range found for each of the 120 bearings; an external synchronisation signal—this is a string of pulses, each indicating the start of a new radar scan; and, an external clock signal—also a string of pulses, each indicating a successive increment in bearing. The ext. sync. signal is used for counter reset and the counter 43 (COUNT 1) registers successive ext. clock pulses to indicate the appropriate target bearing during the scan cycle. The output from all the stages of this first counter 43 is used to generate the spiral index number code and to address the memory 41 (RAM). The bearing code is divided by a factor two (this is performed by dropping the least significant bit of the counter output) and referred to the input of the adder 45 (ADD 1) where it is added to the range code. The output from this adder 45, a 7-bit binary code, is then used to address the programmed memory 47 (PROM 1). This memory 47 is programmed as follows:

TABLE 1

| PROM 1: | ADDRESS (Binary Code) | MEMORY CONTENT (Binary Code) |
|---|---|---|
| | 0 | 0 |
| | 1 | 1 |
| | 2 | 2 |
| | . | . |
| | . | . |
| | . | . |
| | 59 | 59 |
| | 60 | 0 |
| | 61 | 1 |
| | . | . |
| | . | . |
| | . | . |
| | 119 | 59 |
| | 120 | 0 |
| | 121 | 1 |
| | . | . |
| | . | . |
| | . | . |
| | 127 | 7 |
| | 128 | 60 |
| | 129 | 60 |
| | . | . |
| | . | . |
| | . | . |
| | 255 | 60 |

The combination of the first adder 45 (ADD 1) and this first programmed memory 47 (PROM 1) thus provide the codes for the spiral numbers corresponding to range and bearing as given by the algorithm described above. For each bearing and target range response the appropriate spiral number code is written into the central memory 41 (RAM). This is done as each new datum is presented. This part of the address control circuit 23 runs at a rate defined by the external clock. The remaining part of the address control circuit 23 serves to generate the bit codes used for the address signals that are applied to the 120 radial electrodes 15. This part of the circuit is governed by a master clock—clock 49, a square wave oscillator running at 250 kHz. The two parts of the address control circuit 23 run asynchronously. To coordinate the running of the two parts, a synchronous external clock generator 51 is interposed between the data ext. clock input and the first counter 43 (COUNT 1), and a multiplexer 53 (MUX) is interposed between the first counter 43 (COUNT 1) and the central memory 41 (RAM). The synchronous generator 51 serves to delay each external clock pulse until the next master clock pulse is generated. It also provides the read-write R/W enable signals used to control the multiplexer 53 (MUX) and the central memory 41 (RAM), and inhibits all master clock pulses generated whilst the central memory 41 (RAM) is operated in write mode. It controls a clock gate 55 interposed in the master clock line.

The signal generation part of the address control 23 as well as including the master clock 49 (CLOCK), the clock gate 55, the multiplexer 53 (MUX) and the central memory 41 (RAM) also comprises: a second counter 57 (COUNT 2) interposed between the gate 55 and the multiplexer 53 (MUX); a third counter 59 (COUNT 3) connected to the most significant bit output stage of the second counter 57 (COUNT 2); a second adder 61 (ADD 2) connected to the outputs of the third counter 59 (COUNT 3) and of the central memory 41 (RAM); a second programmed memory 63 (PROM 2); and a latched serial in-parallel out 4×32 bit output shift register 65. This register 65, which provides the drive signals for the radial electrodes 15 of the display 1, operates at 15 V logic level. To conserve power consumption, all other components of the address control circuit 23 are chosen to operate at 5 V logic level. A logic level translator 67 is thus interposed between this output register 65 and the second programmed memory 63 (PROM 2). The register 65 is clocked at the master clock rate C and is connected to the clock gate output via the translator 67. Each time the register 65 is reloaded, i.e. following every 128th gated clock pulse, the register is strobed and bit data is transferred to the latched stores of the register 65 to provide the next successive set of bits of the radial electrode drive signals. The strobe signal (LOAD) is provided from the output of the monopulse delay 27 (MONO 1), included in the signals source circuit 21, and is supplied via the translator 67. The spiral electrode signals and the radial electrode signals are thus synchronised. The bit codes for the different address signals are stored in the second programmed memory 63 (PROM 2). The arrangement of this memory 63 is as follows:

TABLE 2

| PROM 2: | | | | | | | | |
|---|---|---|---|---|---|---|---|---|
| ADDRESS: | 0 | 1 | 2 | 3 | 4 | 5 | 6 | 7 |
| CONTENT: | 0 | 0 | 0 | 0 | 0 | 0 | 1 | 0 |
| ADDRESS: | 8 | 9 | 10 | 11 | 12 | 13 | 14 | 15 |
| CONTENT: | 1 | 0 | 1 | 0 | 0 | 1 | 1 | 0 |
| ADDRESS: | 16 | 17 | 18 | 19 | 20 | 21 | 22 | 23 |
| CONTENT: | 0 | 1 | 0 | 0 | 0 | 1 | 0 | 0 |
| ADDRESS: | 24 | 25 | 26 | 27 | 28 | 29 | 30 | 31 |
| CONTENT: | 1 | 0 | 1 | 1 | 0 | 1 | 1 | 0 |
| ADDRESS: | 32 | 33 | 34 | 35 | 36 | 37 | 38 | 39 |
| CONTENT: | 0 | 0 | 1 | 1 | 1 | 0 | 1 | 0 |
| ADDRESS: | 40 | 41 | 42 | 43 | 44 | 45 | 46 | 47 |
| CONTENT: | 0 | 0 | 0 | 1 | 1 | 0 | 1 | 0 |
| ADDRESS: | 48 | 49 | 50 | 51 | 52 | 53 | 54 | 55 |
| CONTENT: | 1 | 1 | 1 | 0 | 0 | 1 | 1 | 1 |
| ADDRESS: | 56 | 57 | 58 | 59 | 60 | 61 | 62 | 63 |
| CONTENT: | 1 | 0 | 1 | 1 | 1 | 1 | 1 | 0 |

It can be seen from this table that if the memory address proceeds from address 0 and is changed one increment each load cycle, 1, 2, . . . 63, the corresponding binary code signal generated is:

0000001010100110 . . . .

This is also the reference signal on the first spiral electrode $S_0$. Starting instead with address 1 and proceeding 2, 3, . . . 63, 0, the signal generated would be:

0000010101001100 . . . .

This is the reference signal on the second spiral electrode $S_1$. Likewise, starting with a given address i, the signal on spiral electrode $S_i$ is generated.

The central memory 41 (RAM) is strobed at the master clock rate via a second monopulse 69 (MONO 2). This allows a sufficient delay for the read address, an address derived from the outputs of the second counter 57 (COUNT 2), to be applied to the central memory 41 (RAM). The read output from the central memory 41 (RAM) is used to address the second programmed memory 63 (PROM 2). The second counter 57 (COUNT 2) keeps a tally of the gated clock pulses (0–127) and provides the radial index number used to address the central memory 41 (RAM). It provides the clock pulses C/128 for the signal source 21, and via the delay 27 (MONO) it provides the load strobe pulses for both output registers 31 and 65. Every 128th gated clock pulse is registered by the third counter 59 (COUNT 3). This therefore keeps a tally of the phase of the reference and address signals. This counts to the 64th gated pulse and then resets the second counter 57 (COUNT 2) to initiate the start of a new signals cycle. When the output count of the third counter 59 is at start zero and the central memory 41 is addressed and strobed at main clock frequency C, the appropriate spiral index numbers, the start addresses, are relayed in succession to address the second programmed memory 63 (PROM 2), and the corresponding start bits for the consecutive radial electrodes are loaded in series in the register 65. On receipt of the 128th gated clock pulse, the register 65 is strobed, the contents of the register transferred to up-date the latched stores, and the start bit codes for each of the 120 radial electrodes 15 are output. The third counter 59 (COUNT 3) registers an increment in count. The second adder 61 then increments the spiral number codes by one, and the second bit codes are likewise generated and output. This is repeated until the set of the sixty-third bit codes are generated. The second counter 57 (COUNT 2) is then reset and this cycle repeated, and so forth.

Figure 6:
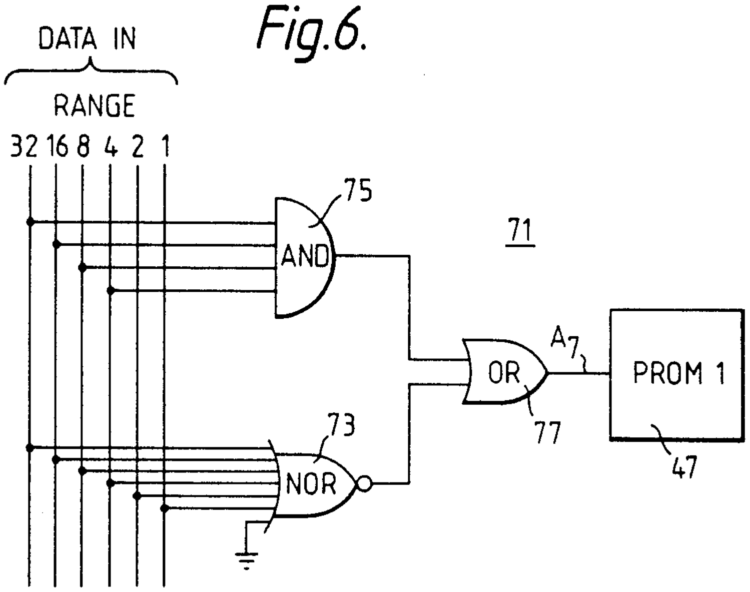
FIG. 6 is a circuit diagram of logic components included in the address control circuit of FIG. 5 above.

Null and false target returns may result in data values binary 0, 60–63. Compensation for these is provided by the additional logic circuit 71 shown in FIG. 6. This comprises a NOR gate 73 connected to all six of the data input lines and an AND gate 75 connected to four most significant bit input lines. The outputs of these gates 73 and 75 are connected to the most significant bit address input, input $A_7$, of the first programmed memory 47 (PROM 1), via an OR gate 77. If the data assumes a value binary 0 the outputs of NOR gate 73 and OR gate 77 are at logic 1. If the data assumes a value binary 60 or greater the outputs of the AND gate 75 and the OR gate 77 are at logic 1.

As can be seen from table 1, a logic 1 address on address $A_7$ corresponding binary addresses 60–127 results in a binary code 60 output regardless of the other address line values. This produces a signal isogonal to all the spiral electrode signals, and all spiral electrode intersections with the corresponding radial electrode 15 are driven ON. A '0' logic level on the PROM address $A_7$ gives normal operation.

For watch and clock display, time data may be coded in (r, $\theta$) polar coordinate form to plot the position of hands. The display electronics described above however, would not be suitable, since hand display requires several plots to one bearing. For this, reference waveforms may be applied to the radial electrodes 15 and selected address signals used for spiral electrodes 13. Different spirals may be dedicated to one hour, minute or second display.

The display and electronics described above is intended for the display of one target only on each bearing. However, more than one target on a bearing could be displayed provided the data for these targets is cued in alternate multiplex fashion, this allowing for many address signal cycles for each competing datum.

Figure 7:
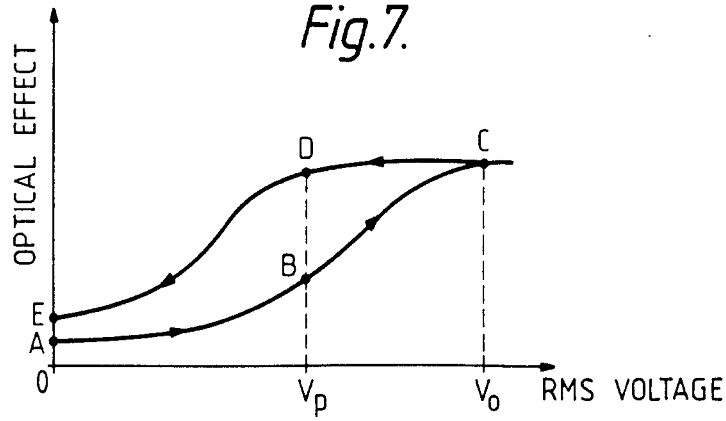
FIG. 7 is an illustrative graph showing the electro-optic response hysteresis typical of a dyed phase change liquid crystal device; and, FIG. 8 is a logic circuit diagram for a 4-bit waveform signal generator.

By applying strobe waveforms to the radial electrodes of the panel described above, and by using a line-at-a-time addressing scheme exploiting the hysteresis of the dyed phase change, it is possible to obtain a PPI radar display in which the target shows persistence, and in which there is no restriction on the number of targets shown per radial. The scheme described below may be implemented to give either positive or negative contrast, as opposed to the scheme already described which gives positive (dark target on bright background) contrast. Further a set of 4-bit addressing waveforms may be used. This means that the clock rate chosen may be low, resulting in low power consumption, even when there are many electrodes in a high resolution display. However, the time constraints on the rate of scan restrict the application of this method to radars in which the angular velocity of targets is relatively slow—eg. long-range radars and radars seeking surface targets on land or sea. FIG. 7 shows a typical hysteresis loop in the electro-optic response of a dyed phase change liquid crystal device. Points A, B, C, D, E on this loop, and voltages $V_p$ and $V_o$ are marked.

The display panel described above is instead addressed using four time-varying waveforms $V_1$, $V_2$, $V_3$ and $V_X$. At any instant in time one radial electrode, the selected radial, bears the waveform $V_1$ while all other radial electrodes bear the waveform $V_X$. Each radial is selected in turn in either clockwise or anticlockwise order. If the information for the radar is obtained from a rotating antenna it is convenient to make the frame time of the display (i.e. the time for all radials to be selected once) equal to, or an integer multiple of, the period of rotation of the antenna.

The spiral electrodes may carry any of the waveforms $V_1$, $V_2$, $V_3$ selected according to the conditions to be satisfied on the selected radial. Table 3 shows how the waveforms on the spiral electrodes at each instant are determined by the states of corresponding picture elements along the selected radial.

TABLE 3

| State of picture element on selected radial | Waveform on corresponding spiral | RMS voltage on picture element |
|---|---|---|
| | (a) Positive Contrast Display | |
| new full target | $V_1$ | O |
| persisting target | $V_2$ | $V_p$ |
| no target | $V_3$ | $V_o$ |
| | (b) Negative Contrast Display | |
| no target | $V_1$ | O |
| persisting target | $V_2$ | $V_p$ |
| new full target | $V_3$ | $V_o$ |

On unselected radials (stable waveform $V_X$) all picture elements experience RMS voltage $V_p$ independently of whether the spiral bears $V_1$, $V_2$, or $V_3$.

Thus the waveforms must be chosen to satisfy the conditions:

$$RMS(V_X-V_1)=RMS(V_X-V_2)=RMS(V_X-V_3)=V_p$$

$$RMS(V_1-V_2)=V_p;\ RMS(V_1-V_3)=V_o$$

These can be satisfied by a set of 4-bit waveforms. A favourable choice, which ensures that no DC voltage develops across any picture element, is:

$V_X=0110$ $V_1=1010$ $V_2=1100$ $V_3=0101$ where "1" denotes logic high i.e. $V_o$ volts and "0" denotes logic low i.e. zero volts.

In practical applications $V_o$ preferably be in the range 15 to 20 V (i.e. CMOS voltages). For the waveforms above, $V_p=V_o/\sqrt{2}=0.707\ V_o$, which is suitable for practical applications.

Referring to FIG. 7, the correspondence between picture element state, RMS voltage, and position on the hysteresis loop is:

TABLE 4

| | State | Selected Radial Voltage | Selected Radial Position (FIG. 1) | Unselected Radial Voltage | Unselected Radial Position (FIG. 1) |
|---|---|---|---|---|---|
| +ve contrast | new target | O | A | $V_p$ | B |
| | persisting target | $V_p$ | B | $V_p$ | B |
| | no target | $V_o$ | C | $V_p$ | D |
| −ve contrast | new target | $V_o$ | C | $V_p$ | D |
| | persisting target | $V_p$ | D | $V_p$ | D |
| | no target | O | A | $V_p$ | B |

The frame time of a display with N' radial electrodes must be longer than both the times $N'\times\tau(D\rightarrow A)$ and $N'\times\tau(B\rightarrow C)$ (other characteristic times will be shorter), in order to ensure that new targets can be generated and persisting trails terminated, without taking picture elements into the state E in FIG. 7. Typical frame times will thus lie in the range 1 to 10 secs.

Figure 8:
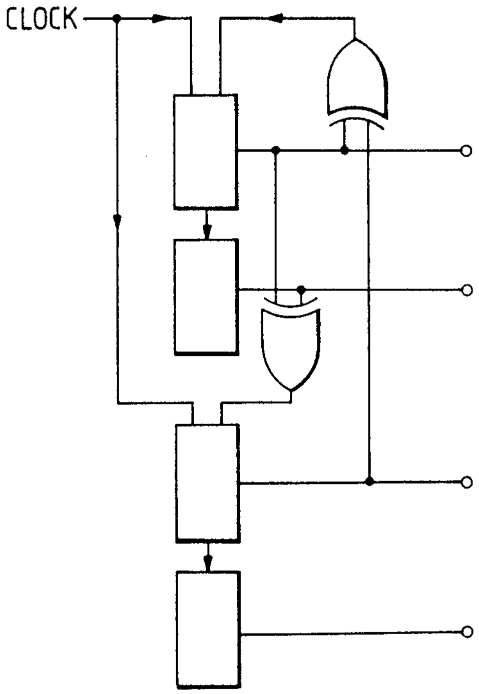

The addressing waveforms suggested above are similar in some of their mathematical properties to pseudorandom binary sequence coded waveforms. In view of their extremely compact form they can be stored in ROM, or they can be generated from shift registers with exclusive-OR feedback. A typical 4-bit waveform generator circuit is shown in FIG. 8. This generator is comprised of two 2-bit shift registers having exclusive-OR gate feedback in the manner shown.

We claim:

1. A polar coordinate plotter comprising the cooperative combination of:
   - a display including a set of concentric spiral electrodes and a set of radial electrodes arranged opposite one another and disposed either side of an electrically sensitive medium of dyed phase change liquid crystal material, the electrodes defining by their overlap a display area formed of a matrix of intersections;
   - an address signals source for providing a set of four signal waveforms $V_1$, $V_2$, $V_3$ and $V_X$;

a first multiplex address control, responsive to coordinate data, connected to the radial electrodes, for applying one of the two signals $V_1$ or $V_x$ to each radial electrode in turn, whilst at the same time applying the signal $V_x$ to all other radial electrodes; and, a second multiplex address control, responsive to coordinate data, connected to the spiral electrodes, for applying to these all each in turn selected signals $V_1$, $V_2$ and $V_3$; the set of four signal waveforms $V_1$, $V_2$, $V_3$ and $V_x$ having the following conditioned interelationships:

$$RMS(V_x-V_1)=RMS(V_x-V_2)=RMS(V_x-V_3)=V_p;$$

$$RMS(V_1-V_2)=V_p;\ RMS(V_1-V_3)=V_o;$$

where $V_p$ is an upper threshold voltage, and $V_o$ a saturation voltage, for dyed phase change hysteresis.

2. A plotter, as claimed in claim 1, wherein the four signal waveforms $V_1$, $V_2$, $V_3$ and $V_x$ have the form of repetitive codes as follows:

$V_1$=,1010,,;
$V_2$=,1100,,;
$V_3$=,0101,,;
$V_x$=,0110,,;

where logic "1" denotes saturation voltage $V_o$ and logic "0" denotes zero volts.

3. A plotter, as claimed in claim 2, wherein the signals source is a generator comprised of two 2-bit registers with exclusive-OR gate feedback.

* * * * *